(12) United States Patent
Miyamoto et al.

(10) Patent No.: US 6,783,370 B2
(45) Date of Patent: Aug. 31, 2004

(54) CONNECTING MEMBER FOR A SOUND GENERATOR

(75) Inventors: Kazumi Miyamoto, Yamanashi-ken (JP); Satoshi Hada, Yamanashi-ken (JP)

(73) Assignee: Citizen Electronics Co., Ltd., Yamanashi-ken (JP)

( * ) Notice: Subject to any disclaimer, the term of this patent is extended or adjusted under 35 U.S.C. 154(b) by 0 days.

(21) Appl. No.: 09/779,605

(22) Filed: Feb. 9, 2001

(65) Prior Publication Data
US 2001/0016452 A1 Aug. 23, 2001

(30) Foreign Application Priority Data

Feb. 23, 2000 (JP) ........................................ 2000-046648

(51) Int. Cl.⁷ ........................ H01R 12/00; H01R 13/40; H05K 1/00
(52) U.S. Cl. ........................................ 439/66; 439/591
(58) Field of Search ........................... 439/500, 66, 85, 439/591, 67

(56) References Cited

U.S. PATENT DOCUMENTS

| | | | | | |
|---|---|---|---|---|---|
| 3,795,037 | A | * | 3/1974 | Luttmer ........................ | 29/628 |
| 3,877,064 | A | * | 4/1975 | Scheingold et al. ......... | 257/696 |
| 4,341,433 | A | * | 7/1982 | Cherian et al. .............. | 439/331 |
| 4,504,353 | A | * | 3/1985 | Ford .............................. | 100/2 |
| 4,756,694 | A | * | 7/1988 | Billman et al. .............. | 439/328 |
| 5,655,913 | A | * | 8/1997 | Castaneda et al. ............ | 439/66 |

* cited by examiner

*Primary Examiner*—Chandrika Prasad
(74) *Attorney, Agent, or Firm*—Dennison, Schultz, Dougherty & MacDonald

(57) ABSTRACT

A connecting spring plate has a first end connecting portion to be connected to a terminal of a sound generator and a second end connecting portion to be connected to a circuit for operating the sound generator. The surface of the first end connecting portion is coated with gold or with a solder, and the surface of the second end connecting portion is coated with gold.

2 Claims, 2 Drawing Sheets

CONNECTING MEMBER FOR A SOUND GENERATOR

BACKGROUND OF THE INVENTION

The present invention relates to a connecting plate for a sound generator such as an electromagnetic sound generator which generates sounds by vibrating a vibration plate by an electromagnet, and more particularly to a connecting plate for a small sound generator used in a portable telephone and a beeper as a telephone ringer.

In recent years, a small electronic device such as the electromagnetic sound generator is directly mounted on a printed circuit board by the surface mount technology. In order to connect the sound generator to the circuit on the printed circuit board, a pair of metallic connecting plates are used.

FIG. 3 is a perspective view of a conventional electromagnetic sound generator disclosed in Japanese Patent Application Laid Open 8-321670. An electromagnetic sound generator 20 comprises a cylindrical case 21 in which sound generating members such as a yoke, an electromagnetic coil and a vibration plate are mounted, and a pair of connecting spring plates 22 downwardly extending from the upper surface of the case 21 in parallel with each other. The connecting spring plate 22 is made of phosphor bronze or stainless steel so as to have elasticity in whole. A lower end portion of each connecting spring plate 22 is upwardly bent to form a bent portion 23. On the underside of the bent portion 23, a projection 24 is formed so as to be pressed against a terminal provided on a printed circuit board of an electronic device such as a portable telephone.

FIG. 4 is a sectional perspective view showing another conventional electromagnetic sound generator. An electromagnetic sound generator 30 comprises a cylindrical case 31 similar to the case 21 of FIG. 3, and a pair of connecting spring plates 32 parallely and outwardly extending from the upper circular surface of the cylindrical case 31. Each of the connecting spring plates 32 is inwardly bent at an intermediate portion thereof into a U-shaped form. A projection 33 is provided on the upper surface of the returned portion of each connecting spring plate 32 so as to be pressed against a terminal provided on a printed circuit board of an electronic device.

The above described connecting spring plates 22 and 32 are coated with Ni plating and with Au plating on the Ni plating as surface treatment. An end of the spring plate is connected to a terminal of the sound generator with solder, and the Au of the other end is connected to the terminal of the printed circuit board by pressing against the terminal.

However, since the whole surface of the connecting spring plate is coated with Au, the manufacturing cost of the spring plate becomes high.

SUMMARY OF THE INVENTION

Accordingly, an object of the present invention is to provide a connecting spring plate which may be manufactured at a low cost without reducing the characteristic and performance of the connecting spring plate.

According to the present invention, there is provided a connecting member for a sound generator comprising a pair of connecting spring plates, each of the connecting spring plates having a first end connecting portion to be connected to a terminal of a sound generator, and a second end connecting portion to be connected to a circuit for operating the sound generator, a surface of the first end connecting portion being treated so as to be soldered to the terminal of the sound generator, and a surface of the second end connecting portion being coated with gold by gold plating.

The surface of the first connecting portion is coated with gold by gold plating.

The surface of the first end connecting portion is coated with a solder by solder plating.

A portion other than the first and second end connecting portions are coated with nickel by nickel plating.

These and other objects and features of the present invention will become more apparent from the following detailed description with reference to the accompanying drawings.

DETAILED DESCRIPTION OF THE PREFERRED EMBODIMENT

Figure 1:
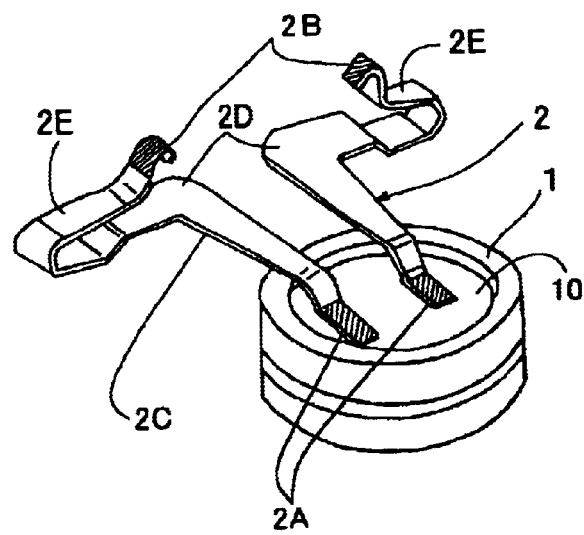
FIG. 1 is a perspective view showing an electromagnetic sound generator provided with a pair of connecting spring plates of the present invention.
Figure 2:
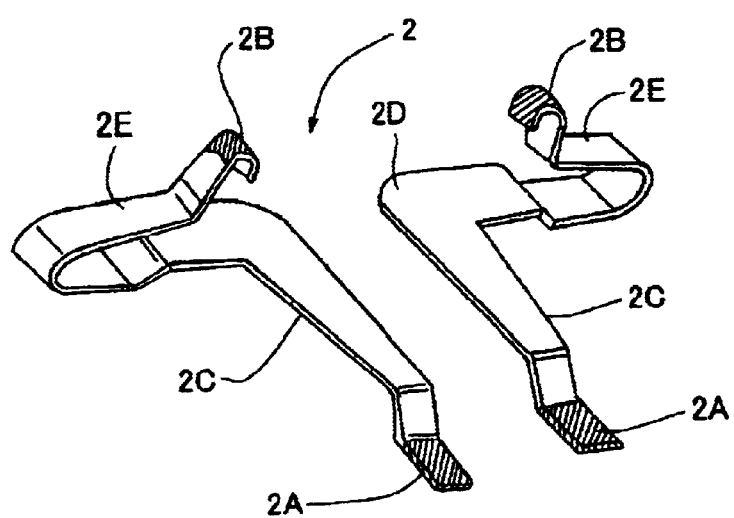
FIG. 2 is a perspective view showing the connecting spring plates.
Figure 3:
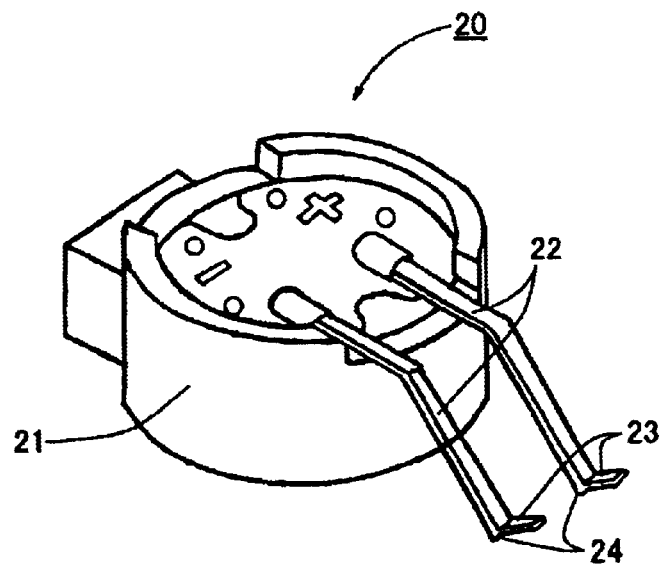
FIG. 3 is a perspective view of a conventional electromagnetic sound generator.
Figure 4:
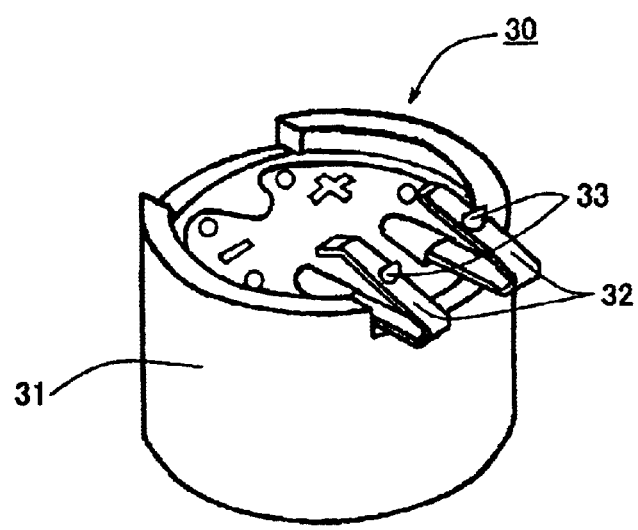
FIG. 4 is a sectional perspective view showing another conventional electromagnectic sound generator.

Referring to FIGS. 1 and 2, an electromagnetic sound generator 1 in which a buzzer is shown. A pair of connecting spring plates 2 are extending from the upper surface or terminal 10 of the sound generator 1 in parallel with each other.

Each of the connecting spring plates 2 is made of phosphor bronze or stainless steel so as to have elasticity in whole, and formed into an L-shaped form and comprises a base end connecting portion 2A, intermediate portion 2C, branch portion 2D and head end connecting portion 2B. The branch portion 2D is extended awat from the other connecting spring plate 2. The branch portion 2D of the spring plate 2 is turned in U-shape. The base end connecting portion 2B is bent in in L-shape and the head end connecting portion 2B is bent in U-shape as connecting portion between the sound generator and a printed circuit board.

The spring plate 2 is coated with nickel (Ni) by nickel plating as surface treatment. The surface of each of the connecting portion 2A to be connected to a terminal of the sound generator 10 is treated so that the connecting portion 2A can be connected to a terminal of the sound generator 10 by soldering.

A branch portion 2D extends outwardly from an end of an intermediate portion 2(C) to thereby form an L-shape in a plane which is the same as the plane of the intermediate portion 2(C), an overlap portion 2E is included and a head end connecting portion 2B extends from the overlap portion 2E. For example, the surface of the connecting portion 2A is coated with gold (Au) by gold plating or with a solder by solder plating. The surface of each connecting portion 2B to be connected to a terminal of the printed circuit board is coated with gold by gold plating.

Each connecting portion 2A coated with Au or a solder is connected to the terminal of the sound generator 10 by a solder.

Each connecting portion 2B coated with gold is connected to the terminal of the printed circuit board of an electronic device such as a portable telephone by pressing the connecting portion against the terminal.

Areas occupied by the connecting portions 2A and 2B of each spring plate 2 are very small, and a most part of the spring plate 2 is an intermediate portion 2C coated with nickel.

Therefore, in accordance with the present invention, the connecting spring plate can be manufactured at a very low cost without reducing the characteristic and performance thereof.

Although the electromagnetic sound generator is employed in the above described embodiment, a moving coil sound generator and a multi-function sound generator having a vibrator and a buzzer can be used for the present invention.

While the invention has been described in conjunction with preferred specific embodiment thereof, it will be understood that this description is intended to illustrate and not limit the scope of the invention, which is defined by the following claims.

What is claimed is:

1. A connecting device for a sound generator comprising:

a pair of connecting spring plates (2), each of the connecting spring plates comprising a base end connecting portion (2A) which is bent into an L-shaped form comprising a lower horizontal portion and an upwardly inclined portion and secured to a terminal of the sound generator (1) at an underside of the lower horizontal portion, an intermediate portion (2C) extending from an upper end of the connecting portion (2A), a branch portion (2D) outwardly extending from the end of the intermediate portion in a plane same as the plane of the intermediate portion so as to form an L-shape together with the intermediate portion, an overlap portion (2E), and a head end connecting portion (2B) extending from said overlap portion, the overlap portion (2E) being formed by turning an end portion of the branch portion in U-shape, the head end connecting portion (2B) being turned into a U-shape for connection to a terminal of an outer circuit by pressing the head end connecting portion against the terminal;

a surface of the base end connecting portion being coated with gold by gold plating;

a surface of the head end connecting portion being coated with gold by gold plating, and said coating with gold by gold plating being limited to the base and the head end connecting portions.

2. The device according to claim 1 wherein a portion of each of the connecting spring plates other than the base and head end connecting portions is coated with nickel by nickel plating.

* * * * *